US006424918B1

(12) United States Patent
Jorgensen et al.

(10) Patent No.: US 6,424,918 B1
(45) Date of Patent: Jul. 23, 2002

(54) METHOD FOR INTEGRATING GRAVITY AND MAGNETIC INVERSION DATA WITH MODEL BASED SEISMIC DATA FOR OIL, GAS AND MINERAL EXPLORATION AND PRODUCTION

(75) Inventors: Gregory Joseph Jorgensen; Jerry Lee Kisabeth; Alan Royce Huffman; John B. Sinton; David W. Bell, all of Ponca City, OK (US)

(73) Assignee: Conoco Inc., Houston, TX (US)

( * ) Notice: Subject to any disclaimer, the term of this patent is extended or adjusted under 35 U.S.C. 154(b) by 0 days.

(21) Appl. No.: 09/399,218

(22) Filed: Sep. 17, 1999

Related U.S. Application Data

(63) Continuation-in-part of application No. 09/285,570, filed on Apr. 2, 1999, now Pat. No. 6,278,948.

(51) Int. Cl.$^7$ ................................................ G01V 1/34
(52) U.S. Cl. ............................................. 702/6; 702/14
(58) Field of Search ................................ 702/14, 6, 16, 702/9; 367/31, 40; 324/345

(56) References Cited

U.S. PATENT DOCUMENTS

| 5,583,825 A | * | 12/1996 | Carrazzone et al. | ........... | 367/31 |
|---|---|---|---|---|---|
| 5,675,147 A | | 10/1997 | Ekstrom et al. | ............ | 250/256 |
| 5,678,643 A | | 10/1997 | Robbins et al. | ............... | 175/45 |
| 5,729,451 A | | 3/1998 | Gibbs et al. | ................. | 364/421 |
| 5,889,729 A | | 3/1999 | Frenkel et al. | ................ | 367/73 |
| 5,920,828 A | * | 7/1999 | Norris et al. | ................. | 702/14 |

OTHER PUBLICATIONS

Yishi, L. et al., "Simultaneous Inversion of Gravimetric and Magnetic Data Constrained With Internal Correspondence Analysis and its Application to the Tarim Basin," Seismology and Geology, vol. 18, No. 4, pp. 361–68 (Dec. 1996)—Abstract only presented in English.

Xichen, W., "The Research on Generalizeal Joint Inversion Method Used to Inverse Magnetic and Density Interface," Jnl of Changchun University of Earth Science (1990)—Abstract only presented in English.

Rongchang, J., "Normalized Solution of Linear Equation System With Applications," Geophysical Prospecting For Petroleum, vol. 31, No. 2, pp. 38–46 (Jun. 1992)—Abstract only presented in English.

Wen–Cai, Y. et al., "Velocity Imaging From Reflection Seismic Data by Joint Inversion Techniques," Acta Geophysica Sinica, vol. 30, No. 6, pp. 617–627 (Nov. 1987)—Abstract only presented in English.

Zhaoqin, M., "Optimal filtering method for separating off gravity anomalies," OGP, 1997 32(3), pp. 376–386—Abstract only presented in English.

Xiwen, W., "Direct hydrocarbon prediction using joint inversion of gravimetric and seismic data," OGP, 1997, 32(2), pp. 221–228—Abstract only presented in English.

Rui, F. et al., "A Non–Block Consistent Model in Seismo–Gravity Inversion," Acta Geophysica Sinica, vol. 36, No. 4, pp. 463–475 (Jul. 1993)—Abstract only presented in English.

(List continued on next page.)

Primary Examiner—Jay Patidar
Assistant Examiner—Victor J. Taylor
(74) Attorney, Agent, or Firm—Madan, Mossman & Sriram

(57) ABSTRACT

A method for modeling geological structures beneath anomalous density zones includes receiving seismic data and using this data to derive the top of a geologic model. Non-seismic data, such as gravity or magnetic data are used to derive the lower boundary of the geologic model in an inversion process. In one embodiment, the predicted parameters are combined with seismic data to obtain a depth image and to derive a velocity model in delineating formations of interest. In another embodiment, the processed seismic data is used to further constrain the inversion of the non-seismic data. Another novel aspect of the invention is the filtering of the non-seismic data during the inversion process in a manner that is consistent with Laplace's equation.

23 Claims, 6 Drawing Sheets

OTHER PUBLICATIONS

Xiaoping, M. et al., "Gravity inversion using weight–smoothed boundary element method," OGP, 1995, 30(4), pp. 523–532—Abstract only presented in English.

Bell, R., Full Tensor Gradiometry: 3–D Tool for the Next Century, pp. 190–193 and drawings (date and publication unknown).

Pratson, L.R. et al., "A High Resolution 3–D Marine Gravity Gradiometry Survey over a Gulf of Mexico Deepwater Subsalt Prospect in the Mississippi Canyon Area," (Apr. 1994)—Abstract.

Dransfield, M.H., "Invariments of the Gravity Gradient Tensor for Exploration Geophysics," CRA Exploration, Abstract G–12B–3.

Kaufmann, R. et al., "Joint Tomographic Inversion of Travel–Time Residuals and Gravity Anomalies for Crustal Velocity Structure in Southeast Tennessee," School of Earth and Atomspheric Sciences, Abstract S41A–4.

Mickus, K. et al., "Gravity Gradient Tensor Analysis of the Arkoma Basin and Ouachita Mountains, Ark. And Ok.," Abstract T11B–13.

Bocchio, F., "A <Tidal> Magnetic Field?," Annali Di Geofisica., vol. XL, No. 5, pp. 1029–1032 (Oct. 1997).

Zadro, Maria et al., "Spectral methods in gravity inversion: the geopotential field and its derivatives," pp. 1433–1443 (date and publication unknown).

Bocchio, F., "Research Note: on some implications of the Poisson relation," Geophys. J. Int. (1998) 133, 207–08.

Pallium, R. Jay et al., "Seismic theory, inversion and resolution," Seismological Research Letters, vol. 62, No. 1, (Jan.–Mar., 1991), p. 19.

Geophysics, Session 112, Oct. 30, 1996 (CCC:C109) Abstract pp. A–283–284.

Murthy, I.V.R. et al., "Gravity Anomalies of a Vertical Cylinder of Polygonal Cross–Section and Their Inversion," Computers & Geosciences, vol. 22, No. 6 pp. 625–630 (1996).

Zheng, Y. et al., "Joint inversion of gravity and magnetic anomalies of eastern Canada," Can. J. Earth Sci., 35: 832–53 (1998).

Chamot–Rooke N., et al., "Constraints on Moho Depth and Crustal Thickness in the Liguro–Provencal Basin from a 3D Gravity Inversion: Geodynamic Implications," Revue de L'Institut Francais Du Petrole, vol. 52, No. 6 Nov.–Dec. 1997 pp. 557–583.

Association Round Table pp. 1925–1926 (date unknown).

Bowin, C. et al., "Depth estimates from ratios of gravity, geoid, and gravity gradient anomalies," Geophysics, vol. 51, No. 1 (Jan. 1986), pp. 123–136, 12 Figs, 2 Tables.

Hansen, R., "Euler Deconvolution and Its Generalizations," pp. 1–8 (date unknown).

Jacobsen, B., "A case for upward continuation as a standard separation filter for potential–field maps," Geophysics, vol. 52, No. 8 (Aug. 1987), pp. 1138–1148, 10 Figs.

Vasco, D.W., "Groups, algebras, and the non–linearity of geophysical inverse problems," Geophys. J. Int. (1997), 131, pp. 9–23.

Ates, A., et al., "Geophysical investigations of the deep structure of the Aydin–Milas region, southwest Turkey: Evidence for the possible extension of the Hellenic Arc," Isr. J. Earth Sci.: 46: pp. 29–40 (1997).

Doering, J. et al., "Gravity Modeling in the Southern Urals," Abstract, Geophysics/Tectonophysics (Posters) Session 159 (Oct. 1996).

Opfer, R.R., "Synthetic Gravity Modelling—An Interpretation Tool to Integrate Seismic and Gravity Data," P140 EAEG—55$^{th}$ Mtg and Technical Exhibition (Jun. 1993).

Papp, G., "Trend Models in the Least–Squares Prediction of Free–Air Gravity Anomalies," Periodica Polytechnica Ser. Civil. Eng., vol. 37, No. 2, pp. 109–130 (1993).

Sumanovac, F., et al., "System Architecture for 3D Gravity Modelling," Geol. Croat. 49/2 pp. 145–153, 12 Figs. (1996).

Danchiv, D. et al., "Computation of Gravity Gradient Tensor in a Rectangular System of Prisms for Vrancea Zone, Galati–Focsani Alignment," Int'l Geophysical Symposium, p. 99 (date unknown).

Henke, C.H. et al., "Interactive three–dimensional gravity inversion and forward modeling using a visualization system," Hamburg, University, Germany, pp. 430–431 (date unknown).

Anderson, R.N., 1998 Annual Meeting Abstract No. 27, "Future Technologies—A Far–Field Industry Review," AAPG Annual Meeting (May, 1998).

Abdelrahman, E.M. et al., "Depth determination for buried spherical and horizontal cylindrical bodies: an iterative approach using moving average residual gravity anomalies," J. Univ Kuwait (Sci.) 22 pp. 114–121 (1995).

Fairhead, J.D. et al., "Application of Semi–Automated Interpretation Methods in Western Siberia and Southern Sudan," EAEG 56$^{th}$ Meeting and Technical Exhibition, 1037 (Jun. 1994).

Casas, A. et al., "An Interactive 2D and 3D Gravity Modelling Programme for IBM–Compatible Personal Computers," EAGE 58$^{th}$ Conference and Technical Exhibition, P184 (Jun. 1996).

Olesen, Odleiv, "Application of the Potential Field Methods to the Study of the Lofoten–Lopphavet Area, Northern Norway," EAEG 56$^{th}$ Meeting and Technical Exhibition, 1034 (Jun. 1994).

Henke, C.H. et al., "Geomaster—A Programme for Interactive 3D Gravity Inversion and Forward Modelling," EAGE 57$^{th}$ Conference and Technical Exhibition, P145 (Jun. 1995).

Stiopol, D. et al., "Gravity and Magnetics Studies in the Vrancea Zone of Romania," EAGE 58$^{th}$ Conference and Technical Exhibition, M056 (Jun. 1996).

Radhakrishna, M. et al., "Gravity Inversion of Closed Two–Dimensional Bodies," Bollettino Di Geofisica Teorica Ed Applicata, vol. XXXIV, No. 136, pp. 287–296 (Dec. 1992).

Nandi, B.K., et al., "A short note on: Identification of the shape of simple causative sources from gravity data," Geophysical Prospecting, 45, pp. 513–520 (1997).

Silitonga, T.H. et al., "Relation of Reservoir Condition Changes to Precision Gravity Measurement with Contribution 3–D Model in Kamojang Geothermal Field," Proceedings Indonesian Petroleum Association (Oct. 1995).

Schenk, R.L. et al., "Integrated Gravity Modeling of Salt Feature in the Mississippi Salt Basin," Transactions of the Gulf Coast Association of Geological Societies, vol. XLVI (1996).

Abstract Page, EOS, vol. 61, No. 17 (Apr. 1980), p. 300.

Mjelde, R. et al., "Crustal structure of the northern part of the Voring Basin, mid–Norway margin, from wide–angle seismic and gravity data," Tectonophysics 293 (1998) 175–205.

Kilty, K., "Short Note: Werner deconvolution of profile potential field data," Geophysics, vol. 48, No. 2 (Feb. 1983): pp. 234–237, 2 Figs, 1 Table.

Coburn, G.W., "Applied Geophysics Report: 3D full tensor gradient method improves subsalt interpretation," Bell Geospace, Inc., (Sep. 1998).

Guspi, F., "Short Note: Three–dimensional Fourier gravity inversion with arbitrary density contrast," Geophysics, vol. 57, No. 1 (Jan. 1992): pp. 131–135, 4 Figs.

Garcia–Abdeslem, J., "Short note: Gravitational attraction of a rectangular prism with depth–dependent density," Geophysics, vol. 57, No. 3 (Mar. 1992) pp. 470–473, 3 Figs.

Guspi, F., "General 2D gravity inversion with density contrast varying with depth," Geoexploration 26 (1990) 253–265.

Dindi, E.W. et al., "Joint three–dimensional inversion of gravity and magnetic data from Jombo Hill alkaline complex, Kenya," Jnl of Geological Society, vol. 145 (1998) pp. 493–504, 12 Figs. 3 Tables.

Richardson, R.M. et al., "The Inversion of Gravity Data into Three–Dimensional Polyhedral Models," Jnl Geophysical Research, vol. 94, No. B6 pp. 7555–7562 (Jun. 1989).

Prutzman, J., "Cold–War Stealth Science Can Aid Seismic Interpretation," JPT, pp. 56–57 (Jan. 1998).

Lines, L.R. et al., "Tutorial A Review of Least–Squares Inversion and its Application to Geophysical Problems," Geophysical Prospecting 32, 159–186 (1984).

Kwok, Y, "Gravity Gradient Tensors Due to a Polyhedron with Polygonal Facets," Geophysical Prospecting 39, 435–443 (1991).

Kwok, Y., "Singularities in gravity computation for vertical cylinders and prisms," Geophys. J. Int. (1991) 104. 1–10.

Montana, C.J. et al., "Program to Calculate the Gravitational Field and Gravity Gradient Tensor Resulting From a System of Right Rectangular Prisms," Computers & Geosciences, vol. 18, No. 5, pp. 587–602 (1992).

Soler, T., "A matrix representation of the potential second–rank gradient tensor for local modelling," Geophys. J.R. astr. Soc. (1985) 81, 363–379.

Hynes, A., "Gravity, flexure,and the deep structure of the Grenville Front, easter Quebec and Labrador," Can. J. Earth Sci., vol. 31 1001–1011 (1994).

Zeyen, H. et al., "3–D joint inversion of magnetic and gravimetric data with a priori information," Geophys. J. Int. (1993) 112, 224–256.

Marino, J. et al., "Gravity and magnetic models of the Midcontinent Rift in eastern Lake Superior," Can. J. Earth Sci. vol. 31 (1994) 661–674.

Thomas, M.D. et al., "An interpretation of gravity anomalies over the Midcontinent Rift, Lake Superior, constrained by GLIMPCE seismic and aeromagnetic data," Can. J. Earth Sci. vol. 31 (1994) 682–697.

Murthy, I.V.R. et al., "Gravity Inversion of Horizontal Circular Discs and Vertical Circular Cylinders," Computers & Geosciences vol. 20 No. 5, pp. 821–838 (1994).

Rao, C.V. et al., "Forward Modeling: Gravity Anomalies of Two–Dimensional Bodies of Arbitrary Shape with Hyperbolic and Parabolic Density Functions," Computers & Geosciences vol. 20 No. 5 pp. 873–880 (1994).

Chai, Y. et al., "Gravity inversion of an interface above which the density contrast varies exponentially with depth," Geophysics, vol. 53, No. 6 (Jun. 1988) pp. 837–845, 7 Figs. 1 Table.

Hammer, P.T.C. et al., "Gravity inversion using seminorm minimization: Density Modeling of Jasper Seamount," Geophysics, vol. 56, No. 1 (Jan. 1991) pp. 68–79, 7 Figs.

Holstein, H. et al., "Gravimetric analysis of uniform polyhedra," Geophysics, vol. 61, No. 2 (Mar.–Apr. 1996) pp. 357–364, 6 Figs., 5 Tables.

Lee, T. et al., "Inverstion modeling of gravity with prismatic mass bodies," Geophysics, vol. 56, No. 9 (Sep. 1991), pp. 1365–1376, 7 Figs.

Nekut, A.G., "Borehole gravity gradiometry," Geophysics, vol. 54, No. 2 (Feb. 1989) pp. 225–234, 12 Figs.

Pedersen, L.B. et al., "The gradient tensor of potential field anomalies: Some implications on data collection and data processing of maps," Geophysics, vol. 55, No. 12 (Dec. 1990) pp. 1558–1566, 6 Figs.

Vasco, D.W. et al., "Inversion of airborne gravity gradient data, southwestern Oklahoma," Geophysics, vol. 56, No. 1 (Jan. 1991) pp. 90–101, 9 Figs., 1 Table.

Rummel, R. et al., "Spectral analysis of the fully gravity tensor," Geophys. J. Int. (1992) 111, 159–169.

Holliger, K. et al., "A comparison of the Moho interpreted from gravity data and from deep seismic reflection data in the northern North Sea," Geophysical Jnl (1989) 97 pp. 247–258.

Guspi, F., "Short Note: Three–dimensional Fourier gravity inversion with arbitrary density contrast," Geophysics, vol. 57, No. 1 (Jan. 1992) pp. 131–135, 4 Figs.

Bulakh, E.G. et al., "Singularity Criteria for Solution of Inverse Gravimetry Problem by the Selection Method," Gaffes. J. 1995, vol. 15, pp. 173–187.

Bulakh, E.G. et al., "Direct and Inverse Gravimetric Problems for a Class of Bodies Approximated by Horizontal Plates," Geophys. J., 1995, vol. 14, pp. 315–330.

Cassano, E. et al., "Gravity and Magnetic Methods in Crustal Exploration," Potential of Deep Seismic Profiling for Hydrocarbon Exploration, Paris 1990, pp. 95–104.

Ceron, F.A. et al., "A Non Linear Iterative Method for the Inversion of Potential Field Data," Rev. Inst. Mex. Petrol., vol. XXIII, No. 3, pp. 22–36 (Jul. 1991)—Abstract only presented in English.

* cited by examiner

METHOD FOR INTEGRATING GRAVITY AND MAGNETIC INVERSION DATA WITH MODEL BASED SEISMIC DATA FOR OIL, GAS AND MINERAL EXPLORATION AND PRODUCTION

CROSS REFERENCES TO RELATED APPLICATIONS

This application is a Continuation-in-Part of U.S. patent application Ser. No. 09/285,570 filed on Apr. 2, 1999, now U.S. Pat. No. 6,278,948.

BACKGROUND OF THE INVENTION

1. Field of the Invention

The present invention pertains to processing gravity and magnetic data using vector and tensor data along with seismic data and more particularly to the inversion of gravity and magnetic data and combining the result of the inversion process with seismic data to provide velocity models and to improve depth models to locate possible hydrocarbon bearing zones in areas of anomalies such as salt, or igneous formations.

2. Related Prior Art

Exploration for hydrocarbons in subsurface environments containing anomalous density variations has always presented problems for traditional seismic imaging techniques by concealing geologic structures beneath zones of anomalous density. Many methods for delineating the extent of the highly anomalous density zones exist.

U.S. Pat. No. 4,987,561, titled "Seismic Imaging of Steeply Dipping Geologic Interfaces," issued to David W. Bell, provides an excellent method for determining the side boundary of a highly anomalous density zone. This patent locates and identifies steeply dipping subsurfaces from seismic reflection data by first identifying select data which has characteristics indicating that the acoustic pulses which it represents have been reflected from a substantially horizontal or steeply dipping interface. These data are analyzed and processed to locate the steeply dipping interface. The processed data are displayed to illustrate the location and dip of the interface. This patent, while helping locate the boundaries, provides nothing to identify the subsurface formations on both sides of the boundary.

There have also been methods for identifying subsurface formations beneath anomalous zones using only seismic data to create a model and processing the data to identify formations in light of the model. By further processing acoustic seismic data, the original model is modified or adjusted to more closely approximate reality.

An example of further processing seismic data to improve a model is U.S. Pat. No. 4,964,103, titled "Three Dimensional Before Stack Depth Migration of Two Dimensional or Three Dimensional Data," issued to James H. Johnson. This patent provides a method of creating a three-dimensional model from two dimensional seismic data. This is done by providing a method of ray tracing to move before stack trace segments to their approximate three-dimensional position. The trace segments are scaled to depth, binned, stacked and compared to the seismic model. The model can then be changed to match the depth trace segments that will be stacked better, moved closer to their correct three-dimensional position and will compare better to the model. This patent uses a rather extensive seismic process to modify a seismic model that is not accurate.

One source of geologic exploration data that has not been used extensively in the past is potential fields data, such as gravity and magnetic data, both vector and tensor data and using potential fields data in combination with seismic data to provide a more accurate depth model or to derive a velocity model.

Gravity gradiometry has been in existence for many years although the more sophisticated versions have been held as military secret until recently. The measurement of gravity has become more acceptable in the late eighteen hundreds when measuring instruments with greater sensitivity were developed. Prior to this time, while gravity could be measured, variations in gravity caused by the effect of a large nearby object at one location, the gravity gradient, could not be reliably measured.

It has been known since the time of Sir Isaac Newton that bodies having mass exert a force on each other. The measurement of this force can identify large objects having a change in density even though the object is buried beneath the earth's surface or in other ways out of sight.

Exploration for hydrocarbons in subsurface environments containing anomalous density variations such as salt formations, shale diapers and high pressure zones create havoc on seismic imaging techniques by concealing geologic structures beneath zones of anomalous density. By utilizing gravity, magnetic and tensor gravity field measurements along with a robust inversion process, these anomalous density zones can be modeled. The spatial resolution obtained from this process is normally much lower resolution than that obtained from acoustic seismic data. However, models obtained from gravity and magnetic data can provide a more accurate starting model for the seismic processing. Using the potential fields data models as a starting point for two dimensional and three dimensional seismic depth imaging greatly enhances the probability of mapping these concealed geologic structures beneath the zones of anomalous density.

SUMMARY OF THE INVENTION

The present invention provides a method and apparatus in which a gravity and magnetics inversion technique developed for use with gravity, Full Tensor Gradiometry (FTG) gravity and magnetics can be used as a driver for building earth models for seismic data processing. The result of the inversion process produces an earth model that contains the geometric description of three dimensional and two dimensional lithologic bodies with anomalous density and velocity. These geometries and the assigned velocities and densities can be used as an input to pre- and post-stack processing steps of seismic data that require a geometrically correct velocity model. Such methods include, but are not limited to Kirchhoff migration, Dip moveout (DMO), finite difference migration and f-x migration. The present invention entails the development of a very robust inversion process to produce models based on vector and tensor potential fields data, both gravity and magnetics. These data combined with seismically imaged portions of the structures as well as a three dimensional density model are input in the inversion process to image the overall anomalous formations. For example, in the case of salt formations in the Gulf of Mexico, a top of a salt map derived from seismic imaging along with a density model and bathymetry, are utilized to produce a base of salt model from the inversion process.

The present invention provides a method for determining parameters representing an anomalous subterranean formation. One or more components of potential fields vector and tensor data are measured at a plurality of locations over a region including the anomalous formation. The potential fields may be either gravity fields or magnetic fields, vector and/or tensor. A geophysical model of the region including the anomalous formation is determined. The seismic data gives a good model to the top of the anomalous formation. A value of the one or more components of the potential fields vector and tensor data at the plurality of locations is estimated for the model. A difference between the estimated values and the measured values at the plurality of locations is determined. The model of the region is updated based on the difference. The estimate of the value of the one or more components, the determination of the difference and the updating of the model is repeated until the difference reaches a minimum value. The updated model is used to determine the parameter of interest. The method is equally applicable to combined gravity and magnetic data. In the method of the present invention the subterranean formation may be selected from the group consisting of a salt body, a shale diapir, and extrusive or intrusive igneous bodies. In one embodiment the parameter of interest can be combined with seismic data representing the same parameter for depth imaging to provide a stacked depth model and to derive a velocity model. In another embodiment, seismic data can be introduced into the inversion process to further refine the lower boundary parameter predictions. The process of inversion followed by seismic imaging followed by another inversion and seismic imaging step is repeated until the results of the gravity magnetics inversion and the seismic imaging processes converge to a single answer or begin to diverge indicating that there is not a unique solution.

DESCRIPTION OF THE PREFERRED EMBODIMENT

Figure 1:
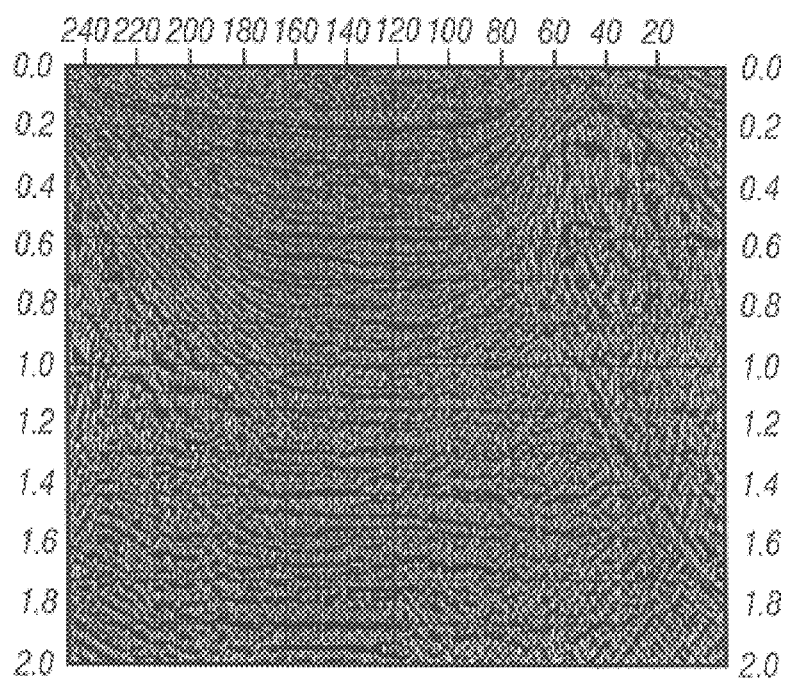
FIG. 1 (Prior art) is a seismic section of an area having an anomalous density zone such as a salt dome.

The present invention utilizes a very robust formulation for calculating gravity, magnetic and tensor fields due to a parameterized model such as salt formations embedded in a known or assumed distribution of sediments. The embedded model is composed of an upper boundary, usually mapped with seismic methods, and a parameterized lower boundary to be determined by an inversion process. The parameterized lower boundary first uses gravity and magnetic data to predict parameters. Then, seismic data can be combined to provide a depth image using the predicted parameters as the driver. Further, a velocity model can be derived using the predicted parameters. In the alternative, the seismic data may be used as an additional constraint in running the inversion process again. This process of inversion followed by seismic imaging followed by another inversion and seismic imaging step may be repeated until the results of the gravity magnetics inversion and the seismic imaging processes converge to a single answer or a point of diminishing returns is reached. Otherwise, if the process results begin to diverge indicating that there is not a unique solution, the process is discontinued.

Co-pending U.S. patent application Ser. No. 09/285,570 having the same assignee and the contents of which are fully incorporated here by reference, discloses a method and apparatus in which a gravity and magnetics inversion technique developed for use with gravity, Full Tensor Gradiometry (FTG) gravity and magnetics can b e used as a driver for building earth models for seismic data processing. Some of the disclosure of the '570 application is included here for convenience.

This formulation of the present invention makes it possible to build an inversion process to predict the lower boundary parameters so as to minimize the difference between any or all of the model fields mentioned above and their measured counterparts. Since this inversion process is so robust and applicable to so many varied field measurements, it is proving to be invaluable for exploration at both regional and prospect scales.

The inversion process of the present invention demonstrates its strength in several areas. In the area of background sediment properties, the density and susceptibility can have any horizontal variability including discontinuities. The depth variation of these properties is assumed to be a polynomial up to order six for density and order five for susceptibility. Thus, for practical purposes, there are no apparent restrictions on the variability of density and susceptibility especially considering the inherent resolution of gravity and magnetic analyses.

For three dimensional inversion, the forward model fields and associated sensitivity matrix components, (partial derivatives of the model fields with respect to the parameters representing the lower boundary), used in the inversion process can be calculated in a two dimensional integration routine simultaneously. This fact makes the three dimensional inversion tractable.

For two dimensional inversion, the problem can be contracted to a one dimensional integration routine allowing inversion steps to be done extremely rapidly. This inversion is used to model single profiles of field data. The two point five and two point seven five dimensional inversions are also applied to single profiles of data. However, rather than assuming the model to be infinitely extended on both sides of the profile, the two point five model has finite but equal extensions on both sides of the profile, whereas the two point seven five dimensional model has unequal extensions. Both types of inversions can be processed very rapidly by utilizing the three dimensional framework. Furthermore, this allows off profile variations of the model to be entertained by either predicting them in the inversion process or by setting them a priori based on seismic and/or other available information.

Computations based on parallel computing techniques were investigated only for the three dimensional case since the two dimensional, two point five dimensional and two point seven five dimensional inversions are already fast. It turns out that the way the inversion process is setup, it is ideal for using multiple processors. Thus, the elapsed time previously required for large three dimensional inversion processes can be greatly reduced. This is especially important for regional studies where large data sets are required.

For data preparation, the forward modeling portion of this inversion software is also used to correct the gravity, magnetic and tensor data for complex bathymetric effects. Bouguer corrections are made assuming a depth dependant density as discussed in background sediment properties in order to obtain better input gravity and tensor data for the inversion process. This represents a substantial improvement over the standard use of a constant Bouguer density.

Those versed in the art would recognize that numerous corrections are applied to magnetic data measurements to get a better representation of the magnetic field. These include a diurnal correction to correct for magnetic field variations during the day, an International Geomagnetic Reference Field (IGRF) correction, leveling correction to resolve misties between data acquired at different times. The present method works equally well whether or not a reduction to pole correction is made: such a correction corrects for the effect of an anomalous body depending upon its position with respect to the magnetic poles of the earth.

Some of the major problems confronting the application of any modeling technique applied to potential field data is the removal of the regional field and, thus, the isolation of the field believed to be associated with the scale of the model being examined. By properly filtering the data between successive iterations in the inversion process, predicted regional fields can be obtained for the gravity and magnetic data sets simultaneously, thus allowing convergence to a common model structure that explains both the band-limited gravity and magnetic fields associated with the anomalous body. The resulting regional fields then can be modeled to predict deep seated structures beneath the area of immediate interest.

Part of the inversion process that dramatically improves the convergence and efficiency of the algorithm is a predictive filtering procedure that reconstructs the regional field from the inversion itself. At each inversion step, the inversion estimates the anomalous body model that is required to fit the data and compares this model response to the observed field. The difference between the model and the observed field is treated as a "residual" or "error", the long wavelength component of this error field is calculated and attributed to the regional field that must be accounted for in the regional model. This long wavelength residual is used to reconstruct the regional model and this reconstructed regional model is compared to the long-wavelength regional component that is removed early in the preprocessing of the potential fields data to make sure that the signal used in the inversion was properly separated between signal related to the anomalous bodies and that related to the regional field.

The present invention also includes a step for processing the tensor data to make sure that the data are consistent in the model that they will invert to. Effectively, this is a process where a flat model is used and densities are imbedded in the model to properly determine the long-wavelength filter that must be applied to the data so that the Laplace Equation is not violated when the inversion is run. This is in contrast to prior art methods that use a simple band-pass filter to get rid of the long wavelengths and derive a residual field. If this is done blindly in the same way for each tensor component, the answer will be wrong because the different components of the tensor data will be inconsistent with each other and not satisfy the Laplace Equation. The new method determines the proper filter for each tensor component and then filters that component so that the earth model used to filter the independent tensors is internally consistent. When this is done properly, it assures that the tensor residuals are correctly treated so that they can converge to a single earth model in the inversion process. This approach is also used to remove the high-frequency white noise as well, and is used to make the entire frequency band in the residual field consistent.

All tests of this invention have utilized base functions equivalent to those used in half cosine transforms for parameterizing the lower boundary in the inversion code. However, it should be emphasized that essentially any orthogonal set of functions can be substituted with minimal effort. For example, it may be found that a power series or Legendre polynomials may provide better convergence in the inverse process.

A very important property of this invention is that the observation positions can be distributed arbitrarily, thus removing the need to have the data in a gridded form on the same datum. This is especially important when inverting on data sets from various contractors simultaneously. Also, individual field observations can be weighted in the inversion process according to their uncertainty.

FIG. 1 is a seismic section illustrating an area of interest having a highly anomalous density zone such as a salt dome. A rounded interface can be seen as masking the formations below. In this example, there exists three rounded formations, all of which mask the formations below. For this seismogram, the lower boundary can not be determined by normal seismic data processing methods.

Figure 2:
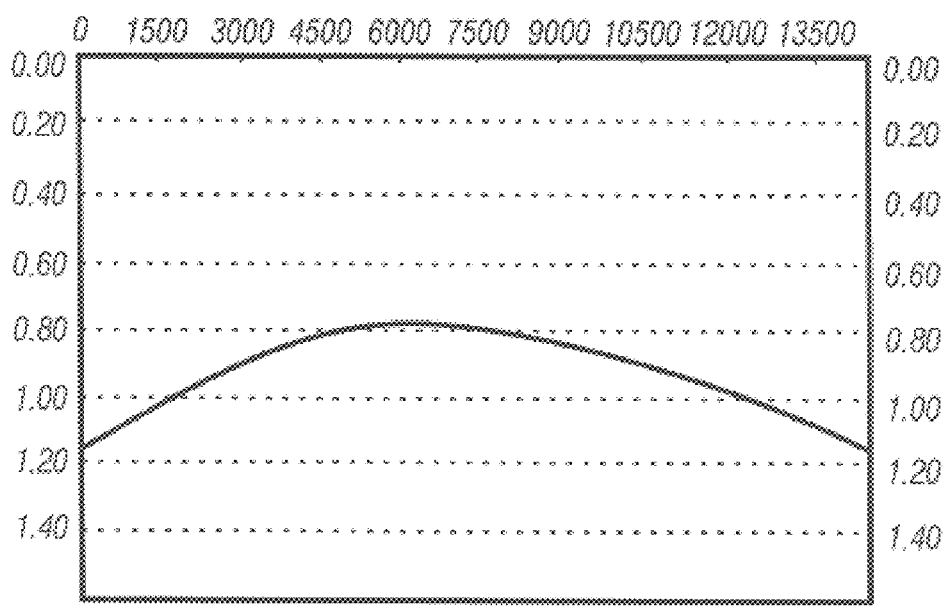
FIG. 2 (Prior art) is a comparison of calculated time event values with picked events from the seismic section of FIG. 1

FIG. 2 illustrates the comparison of calculated time events based solely on seismic data. The small crosses represent the calculated time event values at various points. The solid line represents the selected top boundary from the seismic section of FIG. 1.

Figure 3:
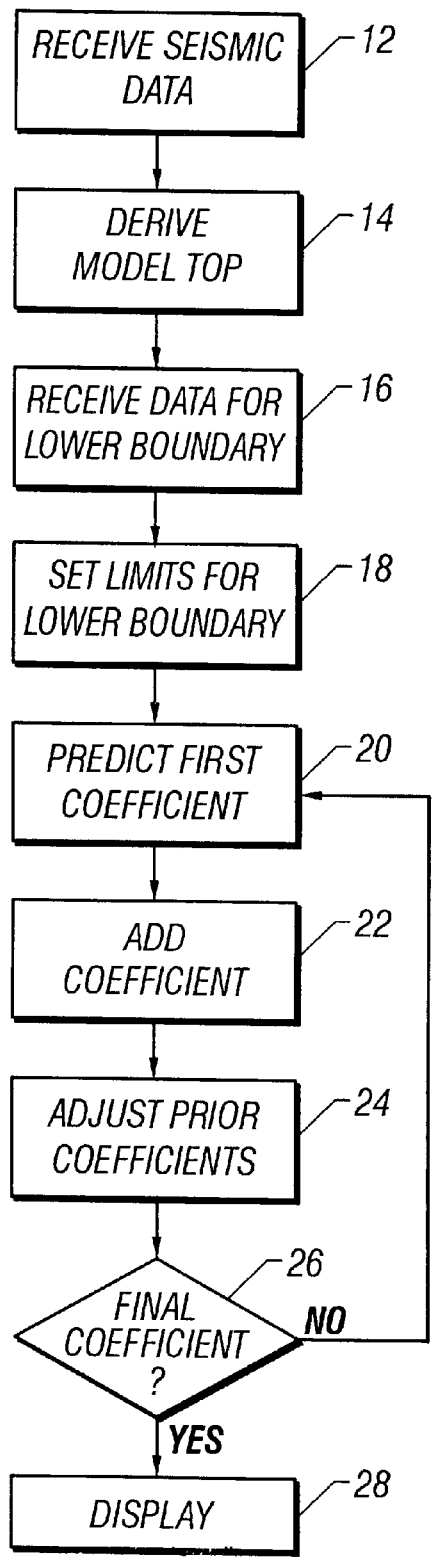
FIG. 3 (Prior art) is a flow chart of a method for modeling geological structures beneath anomalous density zones.

Referring now to FIG. 3, a flow chart illustrating a method for providing a model upon which derivation of subsurface formations can be based. At block acoustic seismic data is received. In general, acoustic seismic data is more reliable than other forms of geologic exploration data in most situations because of the extensive work and research that has been devoted to its use and application.

At block 14, the acoustic seismic data is used to derive the top of a geologic model. As stated previously, acoustic seismic data is very reliable, at least in this situation, for determining the top of the model containing anomalous density zones. The top of the model can be accurately plotted using acoustic seismic data. The bottom of the model can not be so easily done. While acoustic seismic data is generally more reliable than other forms of geological surveying, anomalous density zones, such as a salt dome, block or highly distort reflection information from below the zone. In this type of area acoustic seismic surveying becomes unreliable, which is what occurs in this example. In some cases, the acoustic seismic data becomes so unreliable that no information at all below the salt dome can be obtained from acoustic seismic exploration.

At block 16 data pertaining to the determination of the lower boundary is received. This data may take the form any potential fields data, both vector and tensor. In the formulation used, the type of data is of no concern since any combination of the above mentioned data can be processed simultaneously. Although these types of data are generally not as reliable as acoustic seismic data, in this case, a anomalous density zone, these types of data provide the most reliable starting point.

The data received is used to formulate the limits of the lower boundary for the geologic model for the area of interest at block 18. The actual formation of the lower boundary is done by predicting parameters representing the lower boundary through an inversion process.

Although various inversion techniques can be utilized to determine the parameters (coefficients) representing the lower boundary, the particular one tested in the present invention involves the subsequent inversion of a single coefficient at a time until all coefficients are determined. The total number of coefficients is set a priori at block 18 based upon the minimum wavelength (maximum frequency) desired in the lower boundary. Typical lower boundaries will contain as many as nine hundred coefficients for three-dimensional models, thirty in each horizontal direction. For example, if $x_1$ and $x_2$ are the spatial limits of integration in the x direction and $y_1$ and $y_2$ are the spatial limits of integration in the y direction, and half cosine series are used, the number of terms required in the x and y directions respectively for a minimum wavelength of $\lambda_{min}$ are:

$$n_x = \frac{2(x_2 - x_1)}{\lambda_{min}} + 1 \quad (1)$$

and $$n_y = \frac{(y_2 - y_1)}{\lambda_{min}} + 1 \quad (2)$$

Thus the total number of coefficients representing the lower boundary is $n_x$ times $n_y$.

At block 20, the first coefficient representing a uniform lower boundary (longest wavelength component) is predicted. This coefficient is based on the received data and represents the best fit possible with limited information.

At block 22 another coefficient is added through the inversion process. At block 24 all coefficients added thus far are readjusted through single parameter inversion in the order in which they were added to the lower boundary (from the longest to the shortest wavelength coefficients). This process continues until all coefficients ($n_x$ times $n_y$) have been predicted. At decision block 26 a determination is made as to whether all coefficients have been predicted. If they have not, the program returns to block 22 where another coefficient is added.

If all coefficients have been predicted, the program proceeds to block 28 where the lower boundary is displayed. This display may take any form currently in use in the art, such as a monitor display, a hard copy printout or be kept electronically on tape or disc.

The numerical integrations necessary for each step of the overall inversion process are accomplished using a two dimensional Gaussian quadrature for the two horizontal variables while the vertical integration is usually done analytically. Any or all of the components of the potential fields fields vectors and tensors, along with their respective partial derivatives (with respect to each of the coefficients associated with the lower boundary) are integrated simultaneously for each observation, thus saving substantial computer time. Furthermore, between each inversion for estimating a given coefficient an updated integration mask is produced to restrict the integration to the anomalous density region of the model. Another mask (not shown) is utilized for each observation point to limit the horizontal extent of the integration in order to further conserve computer time. This is especially important since as many as one hundred thousand numerical integrations per observation point per component are performed using in the order of one hundred thousand Gaussian nodes. Thus, for typical exploration applications, billions of integrations are necessary.

For Gaussian integration the integral is broken up into k intervals and apply the two point Gaussian quadrature to each interval. For example, the jth interval is:

$$\int_{a_j}^{b_j} f(x)d(x) = \frac{(b_k - a_k)}{2} \sum_{i=1}^{2} w_i f(x_i) \quad (3)$$

where $w_i = 1.0$, and $$x_i = \frac{(b_k - a_k)}{2} x_i' + \frac{(b_k + a_k)}{2} \quad (4)$$

with $x_i'$ being simply:

$$x_1' = -x_2' = -\frac{1}{\sqrt{3}}$$

Thus, the total integral is $$I = \sum_{k=1}^{K} \int_{a_k}^{b_k} f(x)d(x) \quad (5)$$

This is easily extended to two dimensions as follows:

$$I = \sum_{k=1}^{K} \sum_{l=1}^{L} \int_{a_k}^{b_k} \int_{a_l}^{b_l} f(x, y)dxdy \quad (6)$$

where $$\int_{a_k}^{b_k} \int_{a_l}^{b_l} f(x, y)dxdy = \frac{(b_k - a_k)(b_l - a_l)}{4} \sum_{i=1}^{2} \sum_{j=1}^{2} w_i w_h f(x_i, y_j) \quad (7)$$

with $w_i = w_j = 1.0$, and, as before, $$x_i = \frac{(b_k - a_k)}{2} x_i' + \frac{(b_k + a_k)}{2}$$

and $$y_j = \frac{(b_l - a_l)}{2} y_j' + \frac{(b_l + a_l)}{2}$$

Thus, the entire integration process is controlled by determining the number of intervals K and L that are used to represent the overall integration limits of x and y and, therefore the values for the $a_k$, $b_k$, $a_1$ and $b_1$.

Figure 4:
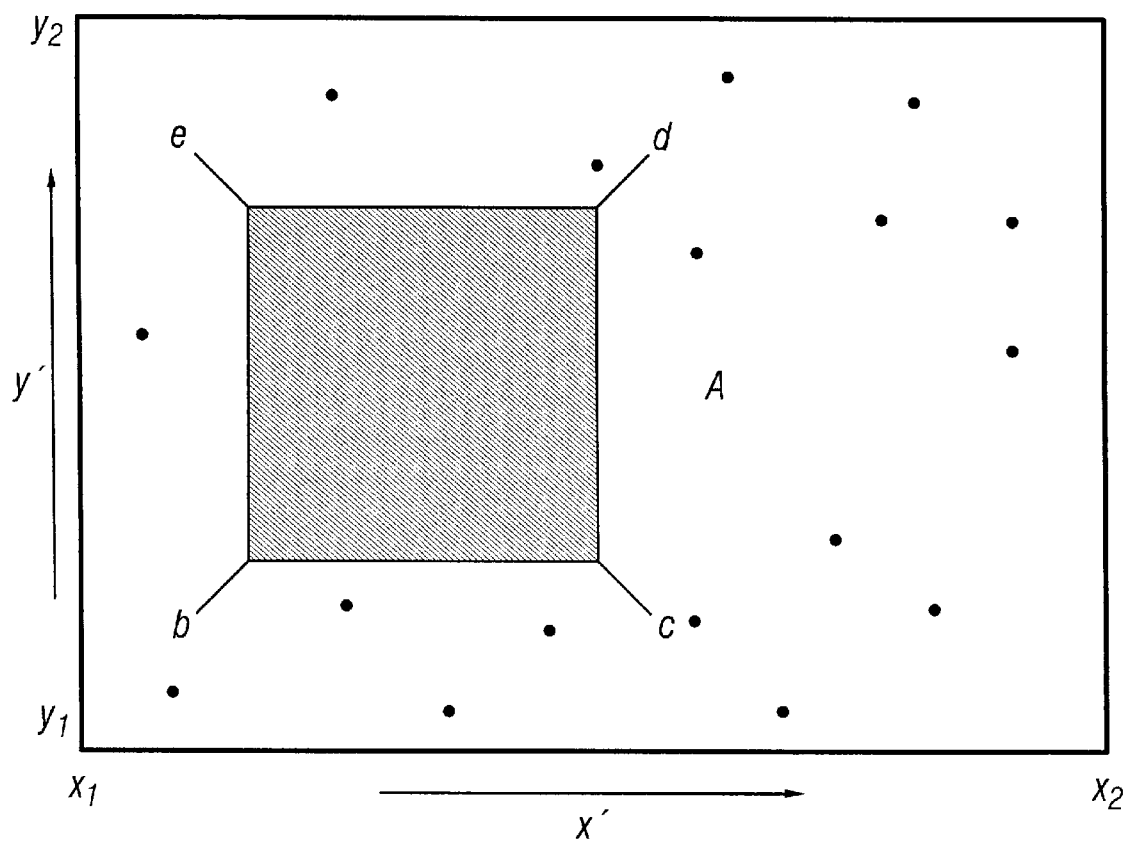
FIG. 4 (Prior art) is a graphical representation of the overall model integration illustrating a chosen window and observation points.

Referring now to FIG. 4, the overall model integration is illustrated. The overall integration is $x_1$ $x_2$ and $y_1$ $y_2$. As illustrated, each observation point A can have a chosen window of integration bcde that is equal to or smaller than the model integration window.

The model window of integration is broken up into K times L, a two by two Gaussian quadrature. The dimensions are given by $(x_2-x_1)/K$ units by $(y_2-y_1)/L$ units. Thus, the interval for the Gaussian points $x_i$ and $y_i$ will be approximately one half of these respectively.

All information about the distribution of the Gaussian points is calculated prior to the actual calculation along with which Gaussian points have to be utilized for model integration at each observation point. This helps make the problem of doing inversion in the spatial domain tractable.

Figure 5:
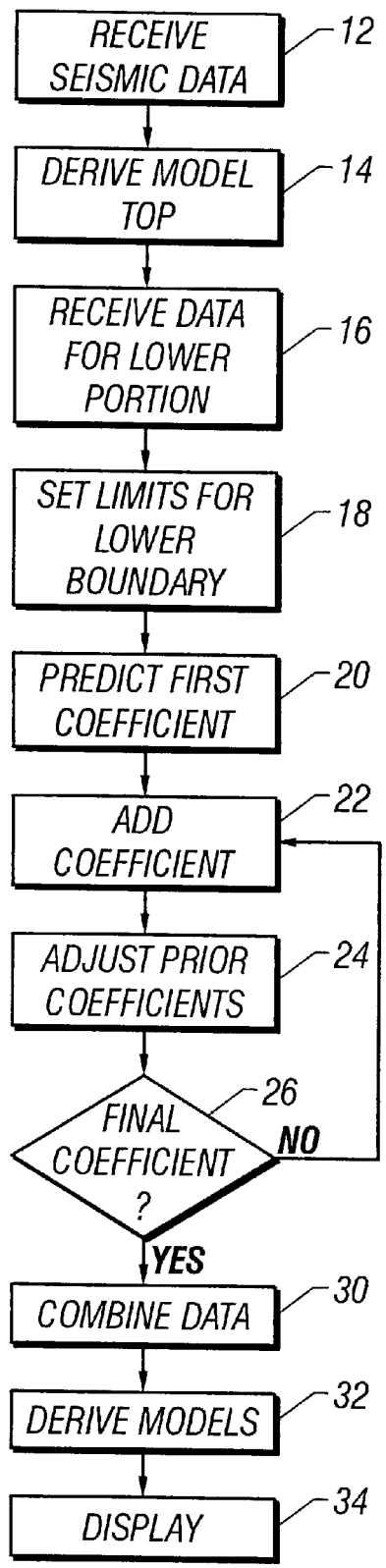
FIG. 5 is a flow chart of an embodiment of the invention for combining seismic data and potential fields data for modeling geological structures beneath anomalous density zones.

Referring now to FIG. 5, a flow chart illustrating a method for combining seismic and potential fields data to provide a model upon which derivation of subsurface formations can be based. This method uses the method of FIG. 3 with the addition of combining seismic data once the lower boundary has been predicted by the potential fields inversion. The method of FIG. 3 will be briefly repeated to illustrate how the combination with seismic data is accomplished. At block 12 acoustic seismic data is received to provide the top layer of the model to be developed.

At block 14, the acoustic seismic data is used to derive the top of a geologic model. As stated previously, acoustic seismic data is reliable for determining the top of the model containing highly anomalous density zones. While the top of the model can be accurately plotted using acoustic seismic data, the bottom of the model can not be so easily done because highly anomalous density zones block or highly distort reflection information.

At block 16 data pertaining to the determination of the lower boundary is received. This data may take the form any potential fields data, both vector and tensor.

The data received is used to formulate the limits of the lower boundary for the geologic model for the area of interest at block 18. The actual formation of the lower boundary is done by predicting parameters representing the lower boundary through an inversion process.

At block 20, the first coefficient representing a uniform lower boundary (longest wavelength component) is predicted. This coefficient is based on the received data and represents the best fit possible with limited information.

At block 22 another coefficient is added through the inversion process. At block 24 all coefficients added thus far are readjusted through single parameter inversion in the order in which they were added to the lower boundary (from the longest to the shortest wavelength coefficients). This process continues until all coefficients ($n_x$ times $n_y$) have been predicted. At decision block 26 a determination is made as to whether all coefficients have been predicted. If they have not, the program returns to block 22 where another coefficient is added.

If all coefficients have been predicted, the program proceeds to block 30 where the predicted lower boundary is combined with seismic data representing the area of the lower boundary. The result of the inversion process produces an earth model that contains the geometric description of three dimensional and two dimensional lithologic bodies with anomalous density and velocity. These geometries and the assigned velocities and densities can be used as an input to pre-and post-stacking process steps that require a geometrically correct velocity model. At this time, The predicted parameters for the lower boundary can be used as a driver for depth imaging.

The output at this point is a model in which the lower boundaries of the anomalous zone and its density have been determined. Knowing the density of the anomalous zone and known relationships between the density of different types of rock types and the velocity of elastic waves in such rocks, an updated velocity model may be obtained. This is done at block 32. The model may then used as input to seismic processing methods, for example, velocity analysis, Kirchhoff migration, Dip Moveout (DMO), finite difference migration, F-X migration, etc., to improve velocity estimates as well as depth and time images of the subsurface.

Once new models have been formulated, the program proceeds to block 34 where the newly derived model using the gravity/magnetic data is displayed. This display may take any form currently in use in the art, such as a monitor display, a hard copy printout or be kept electronically on tape or disc or other suitable storage medium.

Figure 6:
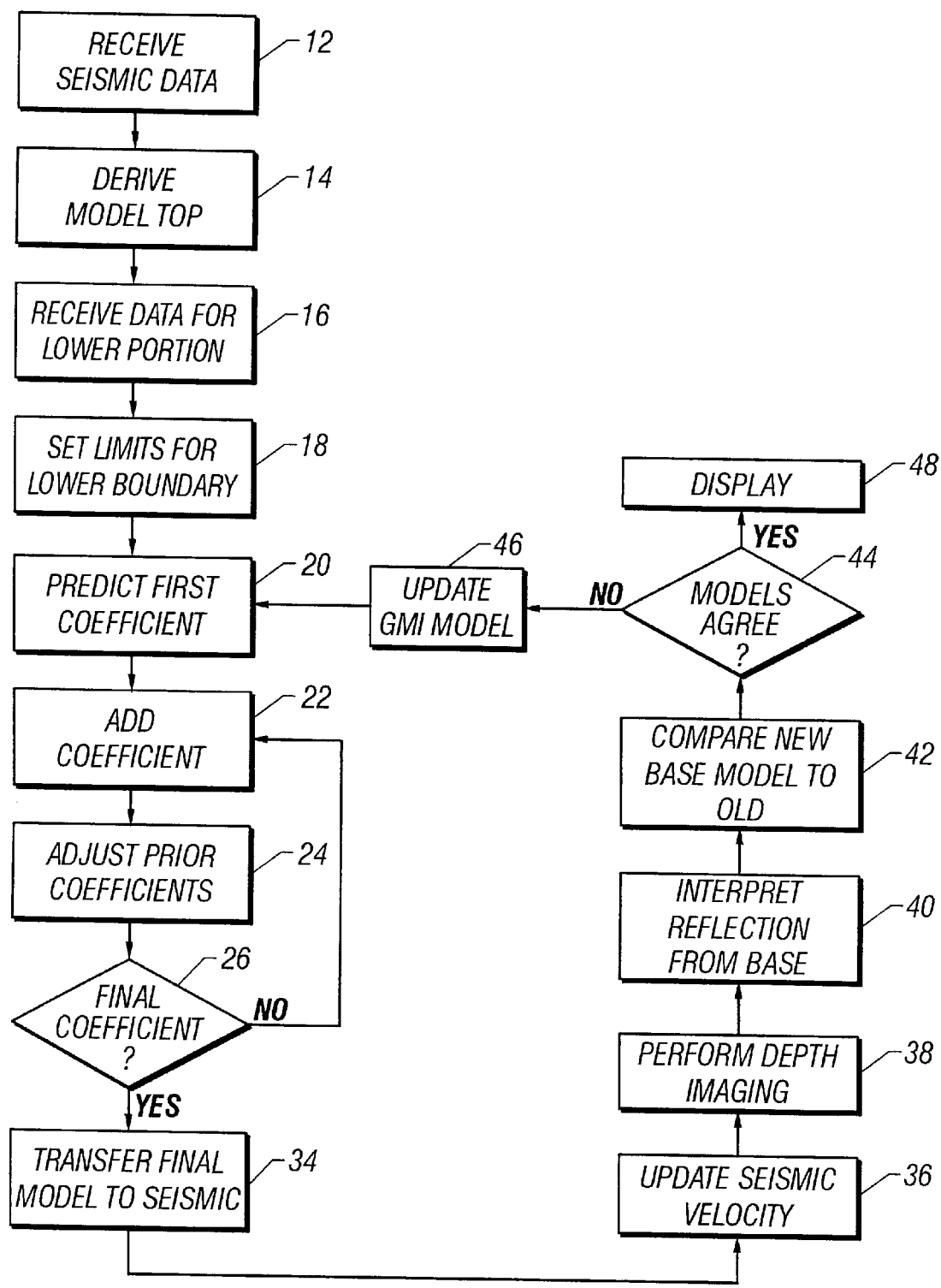
FIG. 6 is a flow chart of an alternate embodiment of the invention for combining seismic data and potential fields data for modeling geological structures beneath anomalous density zones.

Referring now to FIG. 6, a flow chart illustrating a second method for combining seismic and potential fields data to provide a model upon which derivation of subsurface formations can be based. This method uses the method of FIG. 3 and a portion of the method of FIG. 5 with the addition of combining seismic data once the lower boundary has been predicted. The basic method of FIG. 3 will be repeated briefly again to illustrate how the combination of the inversion process with seismic data is accomplished. At block 12 acoustic seismic data is received to provide the top layer of the model to be developed.

At block 14, the acoustic seismic data is used to derive the top of a geologic model. At 16 data pertaining to the determination of the lower boundary is received. This data may take the form any potential fields data, both vector and tensor. Next, at 18 the data received at 16 is used to formulate the limits of the lower boundary for the geologic model for the area of interest as previously described.

At 20, the first coefficient representing a uniform lower boundary (longest wavelength component) is predicted. This coefficient is based on the received data and represents the best fit possible with limited information.

At 22 another coefficient is added through the inversion process. At block 24 all coefficients added thus far are readjusted through single parameter inversion in the order in which they were added to the lower boundary (from the longest to the shortest wavelength coefficients). This process continues until all coefficients ($n_x$ times $n_y$) have been predicted. At decision 26 a determination is made as to whether all coefficients have been predicted. If they have not, the program returns to 22 where another coefficient is added.

If all coefficients have been predicted, the program proceeds to 34 where The Gravity Magnetic Inversion ("GMI") final model is transferred to seismic data and is used as an additional constraint in building the velocity model. Combining the gravity magnetic inversion result with the seismic data represents the beginning of a sub process that uses the inversion data result as a starting earth model to derive a clear under salt body depth or time seismic image.

At block 36 the seismic velocity model is updated. The model may be obtained as described above with reference to FIG. 5. In this step, the result of the inversion is used to drive the seismic imaging process. At 38 depth imaging is performed on the updated seismic velocity model. By this, the base of the anomalous body defined by the starting model becomes imaged in whole or in part.

At 40 the seismic reflection data from the base of the body having anomalous velocity is interpreted. The base of the body as observed in the first imaging step is then mapped so as to define in whole or in part the geometry of the anomalous body. The model now has the bathymetry or topography, the top of the anomalous body where the top and base are both constrained, the inversion process effectively has vertical slabs of the anomalous body as known inputs to the process and the inversion can solve for the remaining portions of the anomalous body that were not imaged by the imaging step 38 using seismic data.

At block 42 the base as interpreted from the seismic reflection data is compared to the base predicted by the gravity magnetic data inversion process. A determination is made 44 as to whether the seismic model and the gravity magnetic model agree. If they do not agree, the process proceeds to 46 where the GMI model is updated with the new seismic constraints taken from where the base of the anomalous velocity body is well imaged. The process proceeds to 20 to perform the inversion process again with the new constraints. This process of inversion followed by seismic imaging followed by another inversion and seismic imaging step is repeated until the results of the gravity-magnetics inversion and the seismic imaging processes converge to a single answer.

At this point a determination may be made if the seismic model and the gravity magnetic model are not converging at all or begin to diverge indicating that there is not a unique solution. It is at this time that the entire process may be terminated since the process is not having desired results. This may be due to either poor quality seismic data or some other problem with the received data. If the seismic model and the gravity magnetic model agree, the process proceeds to 48 where the process is ended and the model may be displayed.

Figure 7:
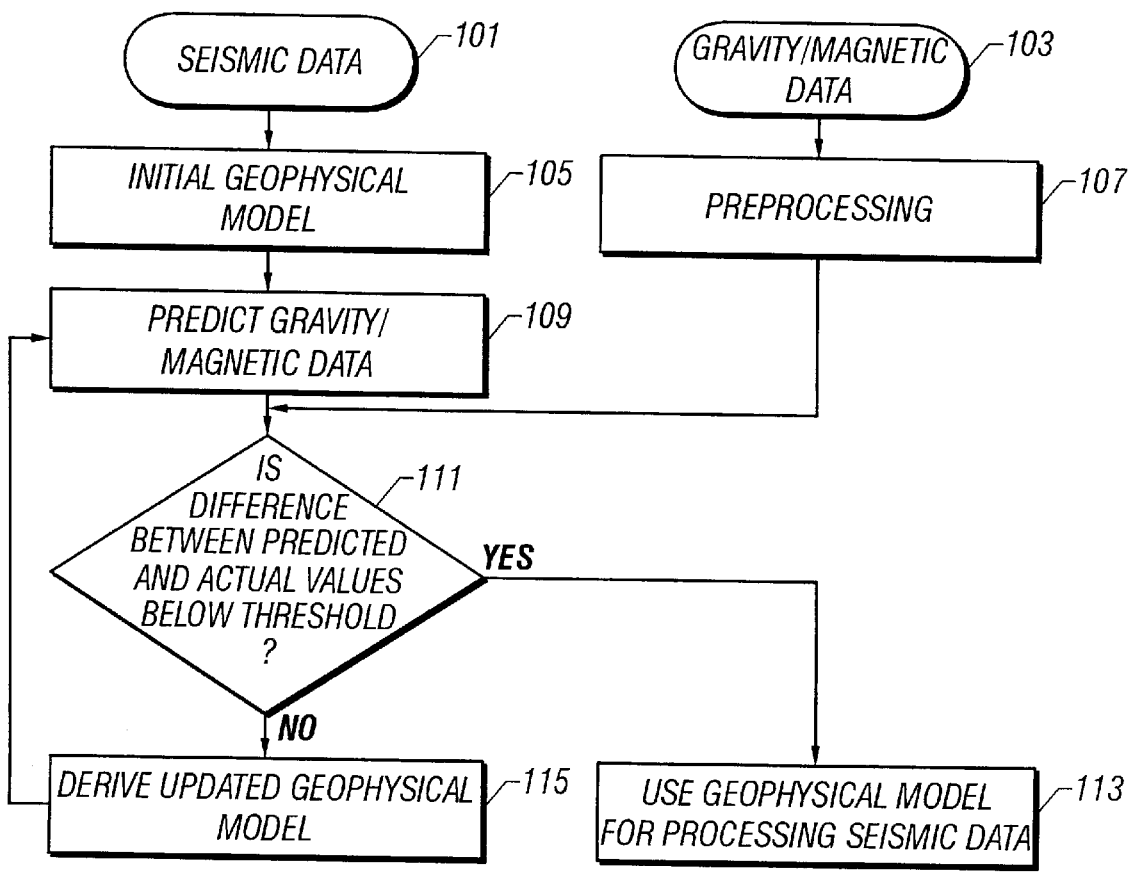
FIG. 7 is a flow chart of an embodiment of the invention for combining seismic data and potential fields data.

Turning now to FIG. 7, the main steps of a method for combined inversion of potential fields data and seismic data are shown. The region of earth being is not limited to those having regions of anomalous density.

Seismic data 101 is used for deriving an initial geophysical model 105. This is done by forming a depth image of the subsurface and using subsurface velocities and/or well logs to get an initial estimate of the densities. Based upon the geophysical model, a prediction is made of the gravity/magnetic data 109. Separately, the gravity/magnetic data 103 are preprocessed as described above. A comparison is made between the predicted values of the gravity/magnetic data and the actual values and this difference is compared to a set threshold 111. If the difference is small 113, then the density model of the subsurface is suitable for additional processing of the seismic data. If the difference is large, then an inversion of the gravity/magnetic data is performed 115 to give an updated geophysical model 115 and processing goes back to 109.

A number of embodiments of the present invention have been described. In one embodiment, the predicted parameters are combined with seismic data to obtain a depth image and to derive a velocity model in delineating formations of interest. In a second embodiment, seismic data representing the lower boundary is determined using the initial inversion as input. This seismic result is mapped to determine the position of the base of the anomalous body and is compared to the model parameters to obtain a difference between the two. The parameters are adjusted to provide a best fit. A new model is formed based on the new predicted parameters, and the GMI and seismic imaging are iterated until the solution converges.

While there has been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A method for determining a parameter of interest of a region of interest of the earth, the method comprising:
    (a) measuring at least one component of potential fields data at a plurality of locations over the region, said potential fields data selected from magnetic data and gravity data;
    (b) acquiring seismic data over the region of interest and deriving an initial geophysical model of the region of interest therefrom;
    (c) for said model, estimating a value of said at least one component of potential fields data at said plurality of locations;
    (d) determining a difference between said estimated value and said measured value of said measurements at said plurality of locations;
    (e) updating the model of the region based on said difference;
    (f) iteratively repeating steps c–e until said difference is less than a predetermined value;
    (g) using said updated model to determine the parameter of interest; and
    (h) using the determined parameter of interest for processing the seismic data indicative of a region of interest to obtain an image of said region of interest.

2. The method of claim 1 wherein the region of interest includes an anomalous formation and deriving the initial geophysical model includes an upper boundary of the anomalous formation.

3. The method according to claim 1 wherein processing the seismic data further comprises deriving a model of seismic velocities for the region of interest.

4. The method of claim 2 wherein the anomalous formation is selected from the group consisting of a salt body, a shale diapir, a magma flow and a magmatic intrusion.

5. The method of claim 1 wherein the at least one component comprises at least two components of potential fields data, and the method further comprises filtering the at least two components to give filtered data components that are consistent with Laplace's equation.

6. The method of claim 1 wherein the potential fields data is at least one of (i) vector gravity data, (ii) vector magnetic data, (iii) tensor gravity data, and (iv) tensor magnetic data.

7. The method of claim 1 further comprising filtering the at least one component of potential fields data to remove a long wavelength regional component of the potential fields data prior to step (c).

8. The method of claim 7 further comprising using the difference at step (d) of claim 1 for additional filtering of the long wavelength regional component.

9. A method for determining geological structures of a region of interest including an anomalous formation comprising:
    (a) obtaining seismic data indicative of the region of interest;
    (b) formulating a model corresponding to the region of interest;
    (c) using the obtained seismic data for obtaining a an upper boundary of the anomalous formation in the model;
    (d) obtaining potential fields data responsive to a lower boundary of said geologic model;
    (e) using an iterative inversion technique for determining parameters of said lower boundary from said obtained potential fields data; and
    (f) using the determined parameters of said lower boundary in processing the obtained seismic data for providing a depth image of the geological structures.

10. The method according to claim 9 wherein processing the obtained seismic data further comprises at least one of (i) deriving a velocity model for a portion of the region of interest, (ii) prestack migration of the obtained seismic data, and, (iii) post-stack migration of the obtained seismic data.

11. The method according to claim 10 wherein using the iterative modeling technique further comprises:

(I) predicting values of the potential fields data from the model;

(II) obtaining a difference between the obtained potential fields data and the predicted values of the potential fields data; and (III) modifying said parameters of said lower boundary in said geologic model to reduce said difference.

12. The method according to claim 9 wherein said obtained potential fields data further comprises at least one component of (i) vector magnetic data, (ii) vector gravity data, (iii) tensor magnetic data, and (iv) tensor gravity data.

13. The method of claim 12 wherein the at least one component comprises at least two components of potential fields data, the method further comprising filtering the at least two components to give filtered data components that are consistent with Laplace's equation.

14. The method of claim 12 further comprising filtering the at least one component of potential fields data to remove a long wavelength regional component of the potential fields data prior to step (e) of claim 9.

15. A method for determining a parameter of interest of an anomalous subterranean formation comprising:

(a) measuring at least one component of potential fields data at a plurality of locations over a region including the anomalous formation, said at least one component selected from (i) vector data, and (ii) tensor data;

(b) acquiring seismic data over the region including the anomalous formation and determining therefrom an initial geophysical model;

(c) for said model, estimating a value of said at least one component of potential fields data at said plurality of locations and giving estimated values of said at least one component of potential fields data;

(d) determining a difference between said estimated values and said measured values at said plurality of locations;

(e) updating the model of the region based on said difference;

(f) iteratively repeating steps c–e until said difference is less than a predetermined value, giving an updated geophysical model;

(g) using the updated model for processing the seismic data measured to obtain an improved geophysical model.

16. The method of claim 15 wherein the anomalous formation is selected from the group consisting of a salt body, a shale diapir, a magma flow and a magmatic intrusion.

17. The method of claim 15 wherein the at least one component comprises at least two components of potential fields data, the method further comprising filtering the at least two components to give filtered data components that are consistent with Laplace's equation.

18. A method for imaging geological structures beneath an anomalous formation comprising:

(a) obtaining seismic data over a region including the anomalous formation;

(b) deriving an initial geophysical model including an upper surface of a said anomalous formation using said obtained seismic data;

(c) obtaining potential fields data indicative of a lower boundary of said anomalous formation;

(d) inverting the obtained potential fields data using the initial geophysical model for obtaining an updated geophysical model including parameters of a lower boundary of the anomalous formation, said inversion technique including sequential addition of terms in a modeling process;

(e) processing said seismic data using said updated geophysical model to obtain an image of the subsurface including said lower boundary and deriving therefrom an improved geophysical model; and (f) inverting the obtained potential fields data using the improved geophysical model to give a further refined geophysical model; and (g) processing the seismic data using the refined geophysical model to image geologic structures beneath the anomalous formation.

19. The method according to claim 18 wherein inverting the potential fields data further comprises obtaining a difference between values of said potential fields data and values of the potential fields data predicted from a geophysical model, and modifying said geophysical model if said difference exceeds a predetermined value.

20. The method according to claim 19 wherein the potential fields data comprises at least one component of data selected from (i) vector magnetic data, (ii) vector gravity data, (iii) tensor magnetic data, and, (iv) tensor gravity data.

21. The method of claim 20 wherein the at least one component comprises at least two components of potential fields data, the method further comprising filtering the at least two components to give filtered data components that are consistent with Laplace's equation.

22. The method of claim 19 further comprising filtering the at least one component of potential fields data to remove a long wavelength regional component of the potential fields data prior to steps (d) and (f).

23. The method of claim 22 further comprising using said difference for additional filtering of the long wavelength regional component.

* * * * *